United States Patent
Seth et al.

(10) Patent No.: US 8,909,631 B1
(45) Date of Patent: Dec. 9, 2014

(54) CREATING TARGETING INFORMATION FOR A USER

(75) Inventors: Rohan Seth, San Francisco, CA (US); Joshua J. Sacks, San Carlos, CA (US); Michele Covell, Palo Alto, CA (US); Michael Chu, Los Altos Hills, CA (US); Shumeet Baluja, Leesburg, VA (US); David Marwood, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/217,605

(22) Filed: Aug. 25, 2011

(51) Int. Cl.
*G06F 7/00* (2006.01)
*G06F 17/30* (2006.01)

(52) U.S. Cl.
CPC .................................. *G06F 17/3087* (2013.01)
USPC ............................ 707/724; 707/728; 707/751

(58) Field of Classification Search
CPC .................................................... G06F 17/3087
USPC ............................................. 707/724, 728, 751
See application file for complete search history.

(56) References Cited

U.S. PATENT DOCUMENTS

| | | | |
|---|---|---|---|
| 7,181,467 B2 * | 2/2007 | Kothuri .................................. 1/1 |
| 7,257,570 B2 * | 8/2007 | Riise et al. ..................... 707/706 |
| 7,743,056 B2 * | 6/2010 | Meisels et al. ................ 707/731 |
| 7,756,534 B2 * | 7/2010 | Anupam et al. .............. 455/466 |
| 2003/0061211 A1 * | 3/2003 | Shultz et al. ....................... 707/3 |
| 2009/0265388 A1 * | 10/2009 | Xiao et al. ................. 707/104.1 |
| 2012/0295639 A1 * | 11/2012 | Fitoussi et al. ............. 455/456.3 |

* cited by examiner

*Primary Examiner* — Mariela Reyes
(74) *Attorney, Agent, or Firm* — McDermott Will & Emery LLP (57) ABSTRACT

Methods, systems, and computer program products, including computer programs encoded on a computer readable storage medium, for providing content to a user based on the mode of the user. A method includes: providing a data structure that includes query logs; processing query logs to determine candidate queries that satisfy a criteria, the processing including determining a location of interest, if any, for each query log entry and where the criteria requires an entry to have been submitted from a location that is different from a location of interest associated with the entry; evaluating the candidate queries to determine targeting information for the location of interest; receiving a request for content from a user that is proximate to the location of interest or has expressed an interest in the location of interest; and providing content to the user based at least in part on the targeting information.

9 Claims, 6 Drawing Sheets

CREATING TARGETING INFORMATION FOR A USER

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content to a user. The method comprises: providing a data structure that includes one or more historical query logs, each query log including queries of individuals submitted to a search system; processing query log entries of the one or more historical query logs to determine candidate queries that satisfy a first criteria, the processing including determining a location of interest, if any, for each query log entry and where the first criteria requires a candidate log entry to have been submitted from a location that is different from a location of interest associated with a given query log entry; evaluating the candidate queries to determine particular targeting information for the location of interest; receiving a request for content from a user that is proximate to the location of interest or has expressed an interest in the location of interest; and providing content to the user based at least in part on the particular targeting information determined from the candidate queries.

In general, another aspect of the subject matter described in this specification can be implemented in methods that include a method for providing content to a user. The method comprises: receiving queries from users where each query references a location of interest and where each is submitted from a location that is different from the location of interest; evaluating the queries to determine particular targeting information for the location of interest; receiving a request for content from a user that is proximate to the location of interest or has expressed an interest in the location of interest; and providing content to the user based at least in part on the particular targeting information determined from the queries.

In general, another aspect of the subject matter described in this specification can be implemented in methods that include a method for targeting content to users. The method comprises: receiving one or more queries that relate to a location of interest; determining candidate queries from the received queries that were submitted from a location that is different from the location of interest; and targeting content to users that express an interest in or are proximately located near the location of interest based at least in part on the candidate queries.

In general, another aspect of the subject matter described in this specification can be implemented in systems that include a system for providing content to a user. The system comprises: a search system, one or more historical query logs, a query log processor, an evaluation engine, and a content selector. Each query log includes queries of individuals submitted to the search system. The query log processor is configured to process query log entries of the one or more historical query logs to determine candidate queries that satisfy a first criteria, the processing including determining a location of interest, if any, for each query log entry and where the first criteria requires a candidate log entry to have been submitted from a location that is different from a location of interest associated with a given query log entry. The evaluation engine is configured to evaluate the candidate queries to determine particular targeting information for the location of interest. The content selector is configured to receive a request for content from a user and provide content to the user, where the content selector provides content, for user requests where the user is proximate to the location of interest or has expressed an interest in the location of interest, based at least in part on the particular targeting information determined from the candidate queries.

In general, another aspect of the subject matter described in this specification can be implemented in a computer program product embodied in a tangible medium. When executed by a processor the computer program product causes the processor to: provide a data structure that includes one or more historical query logs, each query log including queries of individuals submitted to a search system; process query log entries of the one or more historical query logs to determine candidate queries that satisfy a first criteria, the processing including determining a location of interest, if any, for each query log entry and where the first criteria requires a candidate log entry to have been submitted from a location that is different from a location of interest associated with a given query log entry; evaluate the candidate queries to determine particular targeting information for the location of interest; receive a request for content from a user that is proximate to the location of interest or has expressed an interest in the location of interest; and provide content to the user based at least in part on the particular targeting information determined from the candidate queries.

These and other implementations can each optionally include one or more of the following features. Each query log entry can include a location of the user at the time of submission of the query. The location can be determined based on an IP (Internet Protocol) address of a client device that submitted the query. The location can be determined based on a mode of the user and where the mode is selected from either at work, home or away. The location can be derived from a location based service available to a device that submitted the query. The location can be determined based at least in part on a time that the query was submitted. The historical query logs can be logs developed from a search system that included a search control that was presented along with a map application viewport for use in presenting location data, where each query log entry includes query terms and location information describing a location that was concurrently being presented in the viewport at the time a respective query was received and where the location is determined based at least in part on a map shown in the viewport at the time of the query. A query log can be a log of an individual, and processing the query log entries for the one query log can include sorting queries into three or more groups based on a location of where the queries were submitted, the locations selected from home, work and away. The location can be separated by a threshold distance from the location of interest. The threshold distance can be greater than 100 miles. The queries can be stored in a log and each query log entry can include a location of the user at the time of submission of the query.

Particular implementations may realize one or more of the following advantages. Content related to a location can be targeted to a user based on historical activities of other users who have expressed an interest in the location. Content can be targeted to a user who is proximate to a location or who has expressed interest in a location based on targeting information determined from queries submitted by other users when the other users where at locations other than the location (e.g., the other users may have been planning a trip to the location). The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system may maintain usage information, which may include, for example, a query log which includes queries submitted by users to the search system. Each query log entry may include, for example, an indication of the location of the user, one or more query terms, and an indication of a location of interest. The location of interest may be determined, for example, based on the query terms or based on a location presented in a map application used to submit the query. The usage information can be processed to identify candidate queries which may be used to determine targeting information for a particular location of interest, where a candidate query for the location of interest may be identified based on the candidate query being associated with the location of interest and based on the candidate query being submitted from a location that is different from the location of interest. A request for content may be received from a user that is proximate to the location of interest or has expressed an interest in the location of interest. For example, the user may enter one or more query terms which are associated with the location of interest or the user may view the location of interest using a map application. In response to the request for content, content may be provided to the user based at least in part on the targeting information determined from the candidate queries.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Figure 1:
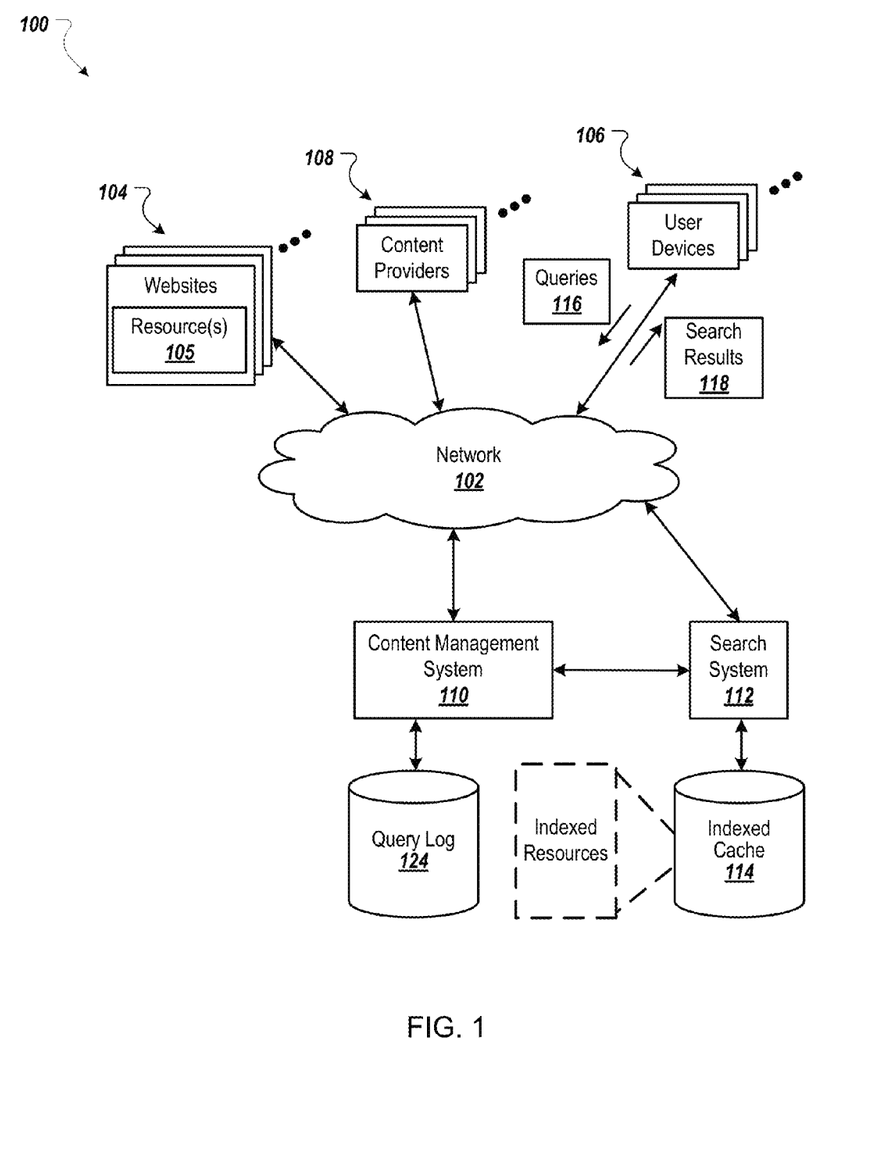
FIG. 1 is a block diagram of an example environment for providing content to a user.

FIG. 1 is a block diagram of an example environment 100 for providing content to a user, for example, based on targeting information determined from queries that each reference a particular location of interest and that were submitted from a location different than the particular location of interest. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 112 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 112 over the network 102.

Some search queries 116 can be submitted using a map application. The search system 112 can, for example, provide a map application which can present a search control along with a viewport for use in presenting location data. A map showing a particular location can be presented in the viewport and the user can enter one or more query terms using the search control.

In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The search system 112 or the content information system 110 can update a query log 124 based on user activities. The query log 124 can include, for example, information about past user activities, such as past requests for resources 105, past search queries 116, other requests for content, web sites visited, or interactions with content. In some implementations, the query log 124 can be derived, for example, from one or more of a search query log, an advertisement log, or requests for content. The query log 124 can include, for each entry, a timestamp, an IP (Internet Protocol) address associated with a requesting user device 106, a type of usage, a location of interest associated with the activity (if any), the location of the user when the activity occurred, and other details associated with the usage.

The query log 124 can be used for various purposes, such as to determine targeting information. For example, targeting information can be determined for a particular location, such as to target users who appear to be traveling to the particular location or who have otherwise expressed an interest in the particular location. For example, the content management system 110 can determine targeting information for a location based on historical information included in query log entries that match a pattern of users traveling to or planning to travel to the particular location.

For example, the content management system 110 can process query log entries of the query log 124 to determine a location of interest, if any, for each query log entry. For example, search query terms may include or may indicate a location of interest. For example, search query terms may include a zip code, a city name, or an address. As another example, a search query term of "Golden Gate Bridge" may indicate a location of "San Francisco". A location of interest can also be determined based on recorded location information associated with a user's views of locations using a map application.

The content management system 110 or the search system 112 can determine the location of the user at the time of submission of a query or at the time of some other user activity, based, for example, on an IP address of a user device 106 that submitted a request. As another example, the user device 106 can determine the location of the user using a location based service (e.g., a GPS (Global Positioning System) service) and can communicate the location to the search system 112 and/or the content management system 110. As described in more detail below, a user's location can also be determined based on a mode (e.g., home, work, away) of the user.

The content management system 110 can determine candidate queries that satisfy a candidate query criteria, where the candidate query criteria defines a candidate query as having been submitted from a location that is different from a location of interest associated with the candidate query. The content management system 110 can evaluate the determined candidate queries to determine targeting information for a location of interest associated with a given candidate query. For example, the content management system 110 can group the candidate queries by associated location of interest, and for each location of interest, the content management system 110 can identify frequently used search terms entered by users who performed the associated candidate queries. Targeting information can be determined based on the identified frequently used search terms, and, as described below, the targeting information can be used to provide content to a user based on a request for content received from the user.

For example, after targeting information has been determined for a particular location, a request for content can be received from a user that is proximate to or has expressed interest in the location. As described above, a user can express interest in a location by, for example, providing one or more search query terms (such as a city name or address) that include or indicate the location. A request can indicate the location of the user and the content management system 110 can determine that the location indicated by the request is proximate to a location for which targeting information has been determined. A user device 106 can, for example, provide location information determined by a location based service available to the user device 106. In some implementations, the content management system 110 can determine whether the user is traveling to the location, such as by comparing the location of the user to a home location associated with the user.

In response to receiving a request for content from a user that is proximate to or has expressed interest in a particular location, the content management system 110 can provide content to the user based at least in part on the particular targeting information determined from the candidate queries associated with the particular location. The request for content can be, for example, a request for a resource 105 or a search query 116 from a user device 106. The content management system 110 can select one or more content items that match the targeting information determined from the candidate queries associated with the location.

The content management system 110 can use other criteria to select content items to provide in response to the request. For example, the request for content can include characteristics (e.g., size, supported media types) of one or more content "slots" that are defined for the requested resource 105 or search results page. As another example, resource keywords associated with a requested resource 105 or a search query 116 can be provided to the content management system 110. Content items selected by the content management system 110 can include content items having characteristics matching the characteristics of content slots and that are identified as relevant to specified resource keywords or search queries 116. For example, content items having targeting keywords that match the resource keywords or the search query 116 can be selected by the content management system 110. The content management system 110 can also select content items at least in part based on the results of an auction.

Figure 2:
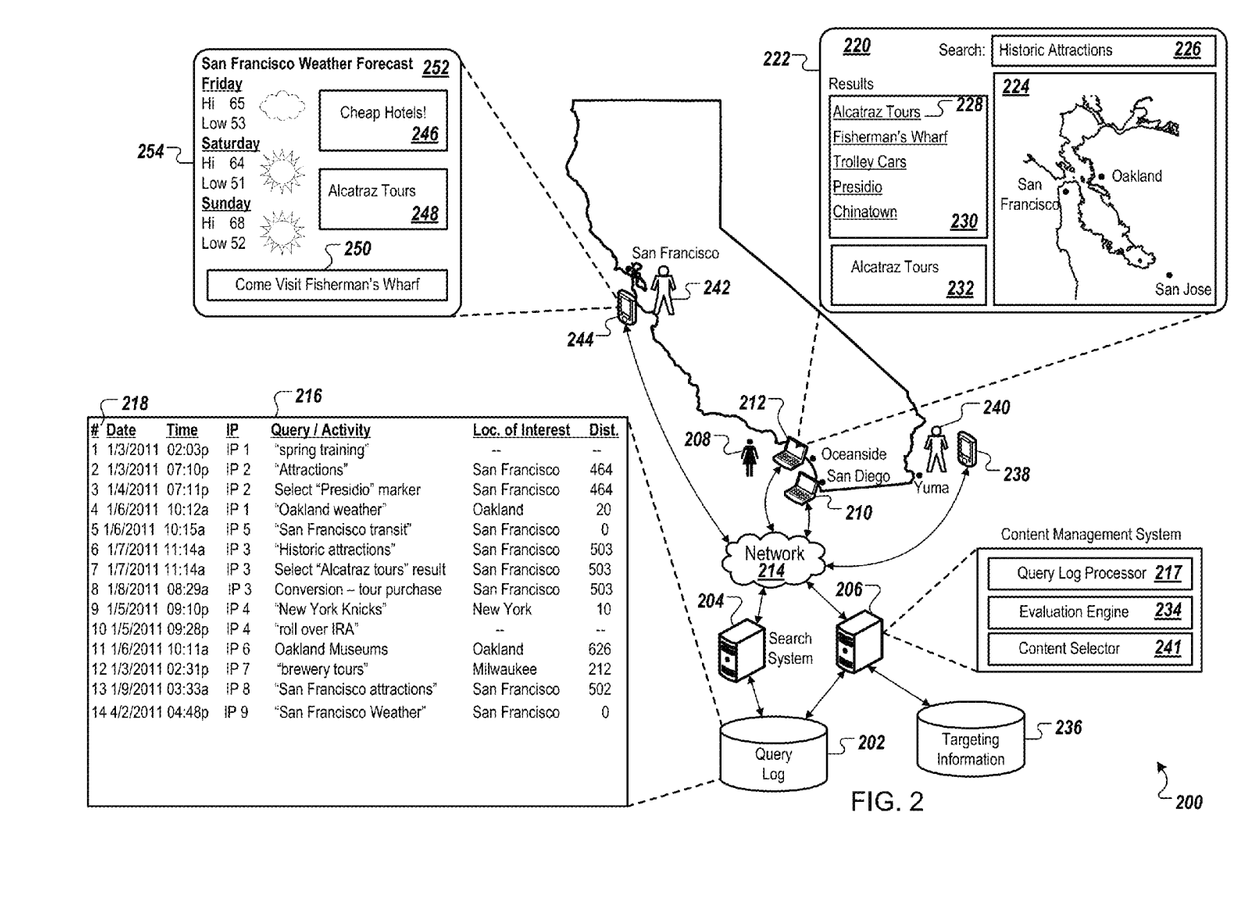
FIG. 2 illustrates a block diagram of an example system for providing content to a user.

FIG. 2 illustrates a block diagram of an example system 200 for providing content to a user. The system 200 includes a query log 202 that includes historical information about queries and other content interactions associated with users of a search system 204 and/or a content management system 206. For example, the query log 202 can include information about search queries submitted to the search system 204.

For example, the query log 202 includes information about search queries submitted by a user 208. As illustrated by a user device 210, the user 208 can submit search queries while using the user device 210 while at work in San Diego. Similarly, as illustrated by a user device 212, the user 208 can submit search queries while using the user device 212 while at home in Oceanside. The user device 210 may be the same device as the user device 212 or may be a different device. The user devices 210 and 212 can communicate with the search system 204 and with the content management system 206 over a network 214.

The query log 202 can include query log entries 216. Each query log entry 216 can include an entry identifier 218. Each query log entry 216 can also include a date and time stamp, an IP address associated with a user device used to perform an activity (e.g., submitting a search query), a location of interest, and location information about the user's location. A distance between the location of interest and the user's location can be stored or can be derived. In some implementations, the query log entries 216 can include a user identifier (e.g., a cookie) identifying the user who performed the activity. In some implementations, user identifiers are not stored in the query log entries 216.

A user's location may be determined based on an IP address of a user device that submitted the query. For example, each IP address may be geo-coded, such as to determine an approximate location associated with the IP address. For example, query long entries 216 with identifiers two and three, each associated with an "IP 2" IP address, may each be associated with the location of Oceanside based on geo-coding the "IP 2" address to an approximate location of Oceanside. The query log entries 216 with identifiers two and three may have been submitted, for example, by the user 208 using the user device 212. As another example, the Oceanside location may have been derived from a location based service (e.g., a GPS receiver) available to the user device 212 and the user device 212 may have provided location information to the search system 204 determined using the location based service.

In some implementations, the location of the user can be determined based on a mode of the user. A mode of a user can be, for example, home, work, or away (e.g., travel). A "home IP address" and a "work IP address" can be determined, based on historical information, for each user. For example, a query log processor 217 included in the content management system 206 can sort the query log entries 216 by user and can process the query log entries 216 for each user to sort the query log entries 216 into groups based on the mode the user was in when performing the activity referenced in a respective query log entry 216.

For example, the query log entries 216 may be evaluated and each entry 216 may be associated with a mode. In some implementations, a query log entry 216 may be associated with a particular mode based on the time of request being received during a predetermined time window that is associated with the mode. For example, the query log entries 216 with identifiers two and three may each be associated with a home mode for the user 208 based on the associated activity being performed during evening hours rather than during first shift working hours. As another example, the query log entries 216 with identifiers six, seven, and eight may each be associated with a work mode for the user 208 based on the time of associated activity occurring during a work day.

The "IP 3" address associated with the query log entries 216 with identifiers six, seven, and eight may be identified as a work IP address for the user 208, for example, based on the "IP 3" address being associated with more work-mode related entries than any other IP address associated with the user 208. Subsequent requests from the user 208 that occur during working hours or that occur from the "IP 3" address can be associated with the work mode and with the work location of San Diego. Similarly, the "IP 2" address may be identified as a home IP address for the user 208, for example, based on the "IP 2" address being associated with more home-mode related entries than any other IP address associated with the user 208. Subsequent requests from the user 208 that occur during non-working hours or that occur from the "IP 2" address can be associated with the home mode and with the home location of Oceanside.

In some implementations, the content management system 206 or the search system 204 can determine that an IP address included in a request from the user 208 is greater than a threshold distance (e.g., one hundred miles) from both the work IP address and the home IP address of the user 208. The content management system 206 or the search system 204 can determine that the user 208 is traveling, and a location that is a non-home and non-work location can be associated with the request, such as a location obtained by geo-coding the IP address included in the request.

The query log processor 217 can determine a location of interest for each query log entry 216 and can determine whether the location of the user when performing the activity associated with the query log entry 216 is different than the location of interest for the query log entry 216. A location of interest may be determined, for example, based on query terms submitted by a user. For example, a location of interest of "San Francisco" can be determined from query terms of "San Francisco transit", "San Francisco attractions", and "San Francisco weather" associated with the query log entries 216 with identifiers five, thirteen, and fourteen, respectively.

A location of interest can also be determined based on a location presented in a map application used to submit a query. For example, the query log entry 216 with identifier six is associated with a query submitted by the user 208 using a map application 220 illustrated on a display device 222. The user 208 may have configured a viewport 224 to display an area including San Francisco and may have entered query terms of "historic attractions" using a search control 226. Location information describing the San Francisco area location being presented in the viewport 224 can be provided to the search system 204 along with the "historic attractions" query terms included in the search control 226. The received location information or location information derived from the received location information can be stored in the query log 202.

A location of interest can also be determined based on user interactions with content. For example, the query log entry 216 with identifier seven corresponds to the user 208 selecting a search result 228 included in a search results area 230. As another example, the query long entry 216 with identifier eight corresponds to the user 208 purchasing a tour of Alcatraz, such as by interacting with an advertisement 232 or by responding to information displayed after selecting the search result 228. The query log entry with identifier three corresponds to the user 208 selecting a map marker (not shown) corresponding to a Presidio attraction located in San Francisco.

Some query log entries 216 may not have a location of interest. For example, the query log entry 216 with identifier one corresponds to a search query of "spring training" which has no particular associated location of interest. As another example, the query log entry 216 with identifier ten corresponding to a search query of "roll over IRA" does not have a particular associated location of interest.

For each query log entry 216 which has an associated location of interest, the query log processor 217 can determine a distance between the location associated with the query log entry 216 and the location of interest associated with the query log entry 216. For example, for the query log entries 216 with identifiers of two and three, the query log processor 217 can determine a distance of four hundred sixty four miles between the user's home location of Oceanside and the location of interest of San Francisco. As another example, for the query log entries 216 with identifiers of six, seven, and eight, the query log processor 217 can determine a distance of five hundred three miles between the user's work location of San Diego and the location of interest of San Francisco.

For some query log entries 216, such as the query log entries 216 with identifiers of five and fourteen, a determined distance may be zero, which may indicate that the user's location was the same as the respective location of interest. For some query log entries 216, such as the query log entry 216 with identifier four, the distance between the location of interest and the user's location may be less than a threshold distance (e.g., less than one hundred miles). The query log entry 216 with identifier four may, for example, correspond to a user located in San Francisco submitting a query for a weather forecast for nearby Oakland.

The query log processor 217 can determine query log entries 216 for which the location associated with the query log entry 216 is separated by at least the threshold distance from the location of interest associated with the query log entry 216 and can determine that such query log entries 216 qualify as candidate query log entries identified for further evaluation. For example, for the query log entries 216 with identifiers of two, three, six, seven, eight, eleven, twelve, and thirteen, the associated, respective location is greater than one hundred miles from the associated, respective location of interest.

An evaluation engine 234 included in the content management system 206 can evaluate the candidate query entries to determine targeting information for a particular location of interest. For example, the evaluation engine 234 can group the candidate query entries by location of interest and can determine the most frequently used search terms associated with each location of interest, and can determine other targeting information, such as targeting keywords associated with content items (e.g., ads) frequently interacted with by users in association with the location of interest.

For example, as mentioned, the query log entries 216 with identifiers two, three, six, seven, eight, eleven, twelve, and thirteen can be candidate query log entries, with the query log entries 216 with identifiers two, three, six, seven, eight, and thirteen being associated with San Francisco. In some implementations, the query log entry 216 with identifier eleven, having a location of Oakland, can also be considered relevant to the San Francisco area, depending on a value used for a configurable location area radius setting. The evaluation engine 217 can evaluate the candidate query log entries associated with the San Francisco area to determine targeting information, such as keywords "attractions", "Presidio", "historic attractions", "Alcatraz", "tours", "Alcatraz tours", and "San Francisco attractions". The evaluation engine 234 can store determined targeting information, in association with a particular location of interest, in a targeting information database 236.

After targeting information has been stored for a particular location of interest, the content management system 206 can receive a request for content from a user that is proximate to the location of interest or has expressed an interest in the location of interest. For example, the content management system 206 can receive a request for content from a user device 238 associated with a user 240 who resides in Yuma, Ariz. The request can include, for example, keywords or other information that indicates a location of interest of San Francisco. As another example, the user 240 can use the map application 220 (or a similar application) to navigate to a location including or representing San Francisco and can submit a search query or other request using the map application 220.

A content selector 241 included in the content management system 206 can select one or more content items based at least in part on targeting information determined from the candidate queries associated with the location of San Francisco. For example, the content selector 241 can select one or more content items that have targeting keywords that match the targeting information determined from the candidate queries. The content management system 206 can provide the one or more selected content items to the user device 238.

As another example, the content management system 206 can determine that the user 240 is traveling in or is proximate to San Francisco (e.g., as illustrated by a user 242). For example, the content management system 206 can compare a home location of Yuma associated with the user 240 to a current location of San Francisco associated with a request received from a user device 244 associated with the user 240. The user device 244 can be the same device as the user device 238 or can be a different device.

The user device 244 can submit a request for content to the content management system 206, such as to fill content slots 246, 248, and 250 included in a resource 252 displayed on a display device 254 of the user device 244. The content management system 206 can determine a location of interest of San Francisco based on determining that the user 242 is traveling in San Francisco, and the content selector 241 can select content items that are associated with San Francisco, such as a San Francisco hotel advertisement displayed in the content slot 246, or advertisements for San Francisco attractions displayed in the content slots 248 and 250. The content management system 206 can provide the advertisements displayed in the content slots 246, 248, and 250 to the user device 244.

Figure 3:
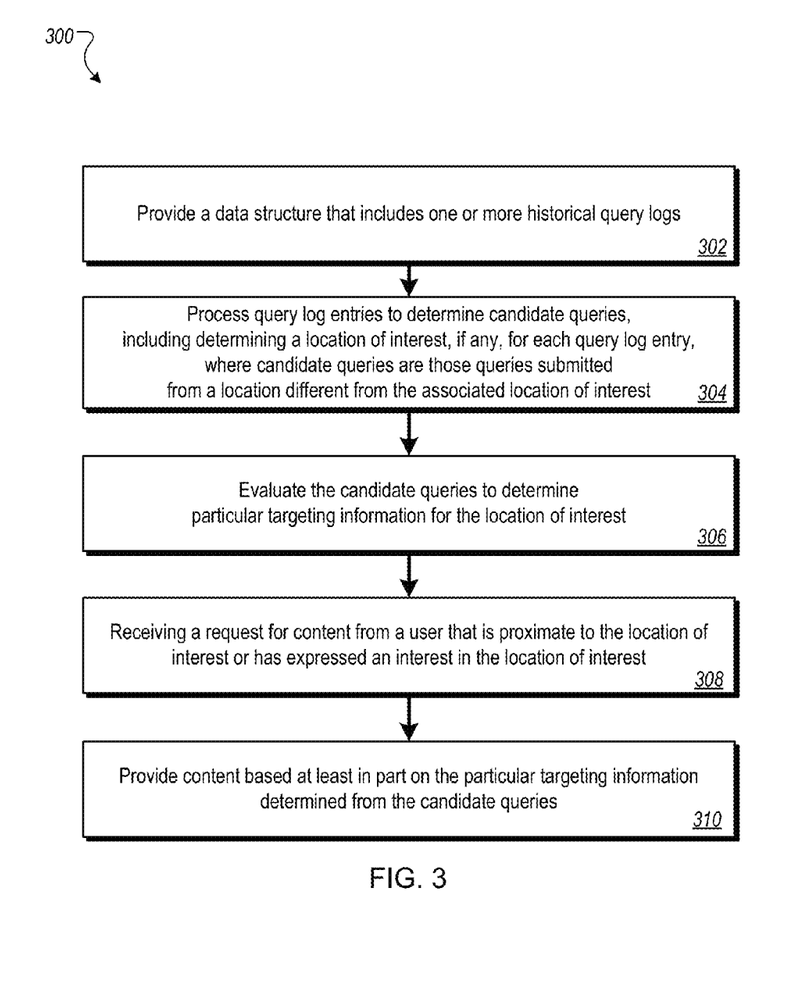
FIG. 3 is a flowchart of an example process for providing content to a user.

FIG. 3 is a flowchart of an example process 300 for providing content to a user, for example, based on targeting information determined from queries that each reference a particular location of interest and that were submitted from a location different than the particular location of interest. The process 300 can be performed, for example, by the content management system 110 described above with respect to FIG. 1. As another example, the process 300 can be performed by the content management system 206 described above with respect to FIG. 2.

A data structure that includes one or more historical query logs is provided (302), where each query log includes queries of individuals submitted to a search system. For example, the query log 124 can be provided to the content management system 110. The query log 124 can include queries of individuals submitted from user devices 106 to the search system 112. The query log 124 can include information about past user activities other than queries, such as past requests for resources 105, other requests for content, web sites visited, or interactions with content, to name a few examples. As another example, the query log 202 (FIG. 2) can be provided to the content management system 206, where the query log 202 includes queries submitted from the user devices 210, 238, and 244 to the search system 204.

Query log entries of the one or more historical query logs are processed to determine candidate queries that satisfy a first criteria (304), the processing including determining a location of interest, if any, for each query log entry and where the first criteria requires a candidate log entry to have been submitted from a location that is different from a location of interest associated with a given query log entry. For example, the query log processor 217 can process the query log entries 216.

Each query log entry 216 can include a location of the user at the time of submission of an associated query. The location can be determined, for example, based on an IP address of a user device that submitted the query. As another example, the location can be derived from a location based service, such as a GPS service, available to a user device that submitted the query.

In some implementations, the location can be determined based on a mode (e.g., home, work, away) of the user. For example, the query log processor 217 can sort the query log entries 216 by user and can, for each user, process the query log entries by sorting the entries for the user into three or more groups based on a location of where the queries were submitted, the locations selected from home, work and away. In some implementations, multiple query logs can be maintained for each user, in which case, the query log processor 217 might not need to sort query log entries. One or more modes may be associated with time of day information (e.g., a work mode may be associated with typical first shift working hours and a home mode may be associated with evening and weekend hours) and a home or work location can be determined based at least in part on a time that the query was submitted, such as by determining a work location if the time matches work-related hours and determining a home location if the time matches home-related hours.

A location of interest associated with a query log entry can be determined, for example, based on search terms associated with the query log entry. As another example, some query log entries may be developed from a search system that includes a search control that is presented along with a map application viewport for use in presenting location data. Query log entries can include query terms and location information describing a location that was concurrently being presented in the viewport at the time a respective query was received. The location of interest can be determined based at least in part on a map shown in the viewport at the time of the query.

The candidate queries are evaluated to determine particular targeting information for the location of interest (306). For example, the evaluation engine 234 can evaluate candidate query log entries determined from the query log entries 216. The evaluation engine 234 can evaluate the candidate query entries to determine targeting information for a particular location of interest. For example, the evaluation engine 234 can group the candidate query entries by location of interest and can determine the most frequently used search terms associated with each location of interest, and can determine other targeting information, such as targeting keywords associated with content items (e.g., ads) frequently interacted with by users in association with the location of interest.

A request for content is received from a user that is proximate to the location of interest or has expressed an interest in the location of interest (308). For example, the user may enter one or more query terms that indicate or that are associated with the location of interest or the user may view the location of interest using a map application. As another example, the content management system 206 can determine that the user is traveling to the location of interest, such as by determining that a current location of the user is proximate to the location of interest and is more than a threshold distance from a home and/or a work location associated with the user.

Content is provided to the user based at least in part on the particular targeting information determined from the candidate queries (310). For example, the content selector 241 can select one or more content items that have targeting keywords that match the targeting information determined from the candidate queries. The content management system 206 can provide the one or more selected content items to a user device associated with the user, for presentation on the user device.

Figure 4:
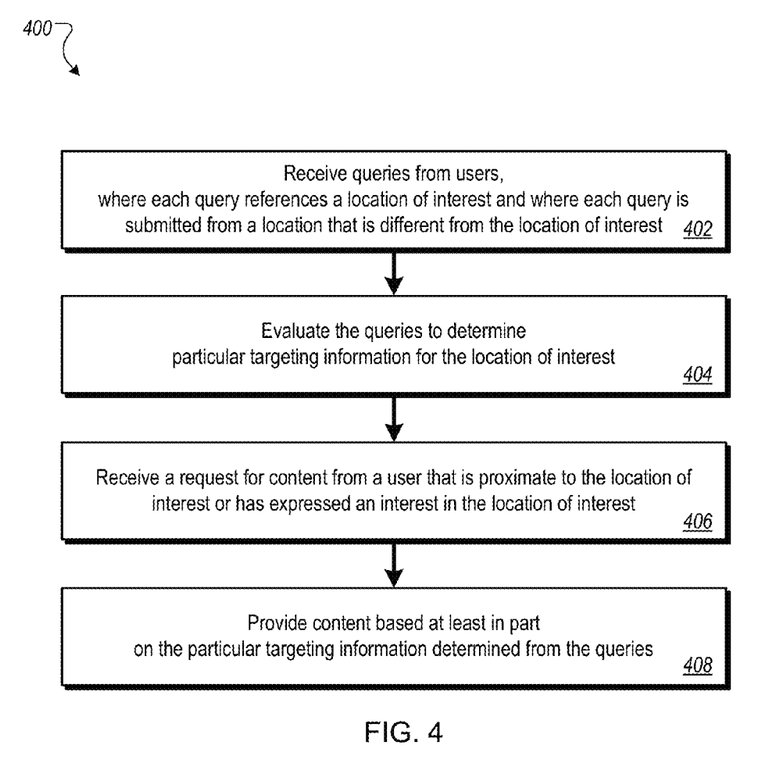
FIG. 4 is a flowchart of an example process for providing content to a user.

FIG. 4 is a flowchart of an example process 400 for providing content to a user. The process 400 can be performed, for example, by the content management system 110 described above with respect to FIG. 1. As another example, the process 400 can be performed by the content management system 206 described above with respect to FIG. 2.

Queries from users are received, where each query references a location of interest and where each query is submitted from a location that is different from the location of interest (402). The location can be separated by a threshold distance from the location of interest. The threshold distance can be a predefined value, such as one hundred miles. The queries can be stored in a log, such as the query log 124 or the query log 202. Each query log entry can include a location of the user at the time of submission of the query and location information indicating the location of interest.

The location can be determined based on an IP address of a client device that submitted the query. The location can also be determined based on a mode (e.g., home, work, away) of the user. The location can be derived from a location based service (e.g., a GPS service) available to a device that submitted the query. The location can be determined based at least in part on a time that the query was submitted. For example, a query submitted during-work related hours can be associated with a work location associated with the user and a query submitted during evening or weekend hours can be associated with a home location associated with the user.

The queries are evaluated to determine particular targeting information for the location of interest (404). For example, an evaluation engine (e.g., the evaluation engine 234) can evaluate the queries to determine targeting information for a particular location of interest. For example, the evaluation engine 234 can group the queries by location of interest and can determine the most frequently used search terms associated with each location of interest, and can determine other targeting information, such as targeting keywords associated with content items (e.g., ads) frequently interacted with by users in association with the location of interest.

A request for content is received from a user that is proximate to the location of interest or has expressed an interest in the location of interest (406). For example, the user may enter one or more query terms that indicate or that are associated with the location of interest or the user may view the location of interest using a map application. As another example, the content management system 206 can determine that the user is traveling to the location of interest, such as by determining that a current location of the user is proximate to the location of interest and is more than a threshold distance from a home and/or a work location associated with the user.

Content is provided to the user based at least in part on the particular targeting information determined from the queries (408). For example, the content selector 241 can select one or more content items that have targeting keywords that match the targeting information determined from the queries. The content management system 206 can provide the one or more selected content items to a user device associated with the user, for presentation on the user device.

Figure 5:
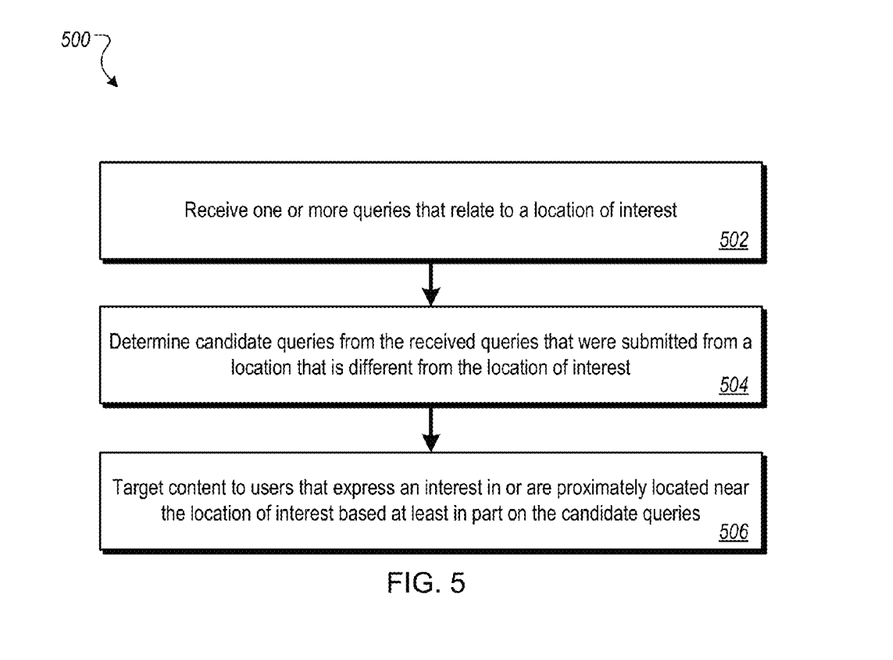
FIG. 5 is a flowchart of an example process for targeting content to users.

FIG. 5 is a flowchart of an example process 500 for targeting content to a user. The process 500 can be performed, for example, by the content management system 110 described above with respect to FIG. 1. As another example, the process 500 can be performed by the content management system 206 described above with respect to FIG. 2.

One or more queries that relate to a location of interest are received (502). Each query can be associated with a location of interest. The location of interest associated with a query can be determined, for example, based on search terms associated with the query. As another example, some queries may be received using a search control that is presented along with a map application viewport for use in presenting location data. Location information describing a location that was concurrently being presented in the viewport at the time a respective query was received can be associated with the query. The location of interest can be determined based at least in part on a map shown in the viewport at the time of the query.

Candidate queries are determined from the received queries that were submitted from a location that is different from the location of interest (504). For each query, a location of the user at the time of submission of the query can be associated with the query. The location can be determined based on an IP address of a client device that submitted the query. The location can also be determined based on a mode (e.g., home, work, away) of the user. The location can be derived from a location based service (e.g., a GPS service) available to a device that submitted the query. The location can be determined based at least in part on a time that the query was submitted. For example, a query submitted during-work related hours can be associated with a work location associated with the user and a query submitted during evening or weekend hours can be associated with a home location associated with the user. For each query, the location can be compared to the location of interest, and the query can be determined to be a candidate query if a difference in distance between the location and the location of interest is more than a threshold distance (e.g., one hundred miles).

Content is targeted to users that express an interest in or are proximately located near the location of interest based at least in part on the candidate queries (506). For example, the queries can be evaluated to determine particular targeting information for the location of interest. For example, an evaluation engine (e.g., the evaluation engine 234) can group the queries by location of interest and can determine the most frequently used search terms associated with each location of interest, and can determine other targeting information, such as targeting keywords associated with content items (e.g., ads) frequently interacted with by users in association with the location of interest.

A request for content can be received from a user that is proximate to the location of interest or has expressed an interest in the location of interest. For example, the user may enter one or more query terms that indicate or that are associated with the location of interest or the user may view the location of interest using a map application. As another example, the content management system 206 can determine that the user is traveling to the location of interest, such as by determining that a current location of the user is proximate to the location of interest and is more than a threshold distance from a home and/or a work location associated with the user.

Content can be provided to the user based at least in part on the particular targeting information determined from the queries. For example, the content selector 241 can select one or more content items that have targeting keywords that match the targeting information determined from the queries. The content management system 206 can provide the one or more selected content items to a user device associated with the user, for presentation on the user device.

Figure 6:
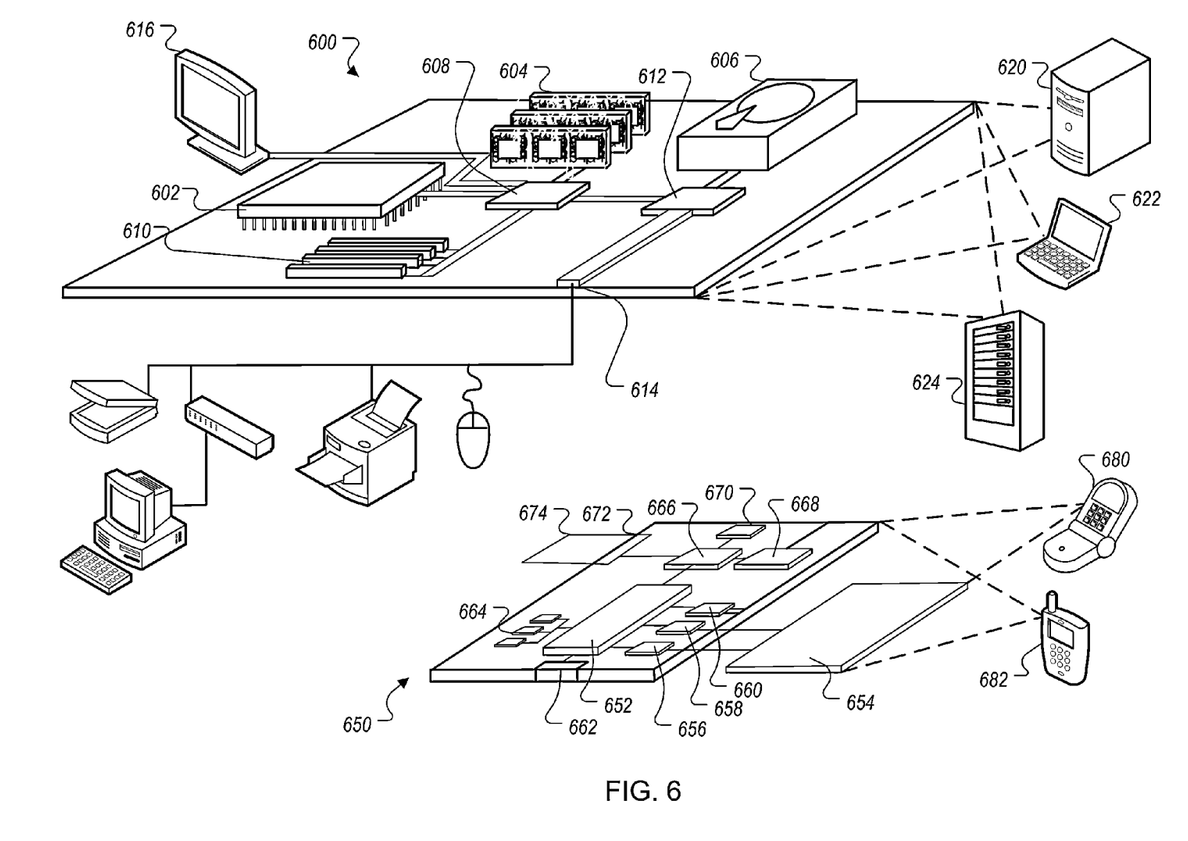
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
providing a data structure that includes one or more historical query logs, each query log including query log entries, each query log entry comprising a respective search query submitted by an individual to a search computer system;
accessing the query log entries of the one or more historical query logs;
determining a location of interest for one or more of the query log entries, wherein the location of interest for each query log entry is based on text of the respective search query or a view of a map application associated with the query log entry;
determining, for each of the one or more query log entries, a submission location corresponding to where the respective search query was submitted;
calculating, for each of the one or more query log entries, a distance between the location of interest for the query log entry and the submission location of the query log entry;
determining, for each of the one or more query log entries, whether the calculated distance exceeds a threshold value, and identifying the query log entry as a candidate query only if the calculated distance exceeds the threshold value;
evaluating the one or more candidate queries to determine particular targeting information for the location of interest;
receiving a request for content from a user that is proximate to the location of interest or that has expressed an interest in the location of interest; and
providing content to the user based at least in part on the particular targeting information determined from the one or more candidate queries.

2. The method of claim 1, wherein the submission location is determined based on an IP (Internet Protocol) address of a client device that submitted the query.

3. The method of claim 2, wherein one query log is a log of an individual, and where processing the query log entries for the one query log includes sorting queries into three or more groups based on a location of where the queries were submitted, the locations selected from home, work and away.

4. The method of claim 1, wherein the submission location is determined based on a mode of the user, and wherein the mode is selected from either at work, home or away.

5. The method of claim 1, wherein the submission location is derived from a location based service available to a device that submitted the query.

6. The method of claim 1, wherein the historical query logs are logs developed from the search computer system that included a search control that was presented along with a map application viewport for use in presenting location data, wherein each query log entry includes query terms and location information describing a location that was concurrently being presented in the viewport at the time a respective query was received, and wherein the view of a map application associated with the query log entry corresponds to a map shown in the viewport at the time of the query.

7. A system comprising:
one or more processors; and
a machine-readable medium comprising instructions stored therein, which when executed by the processors, cause the processors to perform operations comprising:
accessing query log entries of one or more historical query logs, each query log entry comprising a respective search query submitted by an individual to a search system;
determining a location of interest for one or more of the query log entries, wherein the location of interest for each query log entry is based on text of the respective search query or a view of a map application associated with the query log entry;
determining, for each of the one or more query log entries, a submission location corresponding to where the respective search query was submitted;
calculating, for each of the one or more query log entries, a distance between the location of interest for the query log entry and the submission location of the query log entry;
determining, for each of the one or more query log entries, whether the calculated distance exceeds a threshold value, and identifying the query log entry as a candidate query only if the calculated distance exceeds the threshold value;
evaluating the one or more candidate queries to determine particular targeting information for the location of interest;

receiving a request for content from a user that is proximate to the location of interest or that has expressed an interest in the location of interest; and providing content to the user based at least in part on the particular targeting information determined from the one or more candidate queries.

8. A non-transitory computer-readable medium comprising instructions stored therein, that when executed by a processor, cause the processor to:

provide a data structure that includes one or more historical query logs, each query log including query log entries, each query log entry comprising a respective search query submitted by an individual to a search system;

access the query log entries of the one or more historical query logs;

determining a location of interest for one or more of the query log entries, wherein the location of interest for each query log entry is based on text of the respective search query or a view of a map application associated with the query log entry;

determining, for each of the one or more query log entries, a submission location corresponding to where the respective search query was submitted;

calculating, for each of the one or more query log entries, a distance between the location of interest for the query log entry and the submission location of the query log entry;

determining, for each of the one or more query log entries, whether the calculated distance exceeds a threshold value, and identifying the query log entry as a candidate query only if the calculated distance exceeds the threshold value;

evaluate the one or more candidate queries to determine particular targeting information for the location of interest;

receive a request for content from a user that is proximate to the location of interest or that has expressed an interest in the location of interest; and provide content to the user based at least in part on the particular targeting information determined from the one or more candidate queries.

9. The method of claim 1, wherein the submission location corresponding to where each search query was submitted is based at least in part on a time that each search query was submitted.

* * * * *